INVENTORS.
ROBERT FRANK SHAW
GERALD ALVIN JOHNSON
BY
Samuel Branch Walker
ATTORNEY

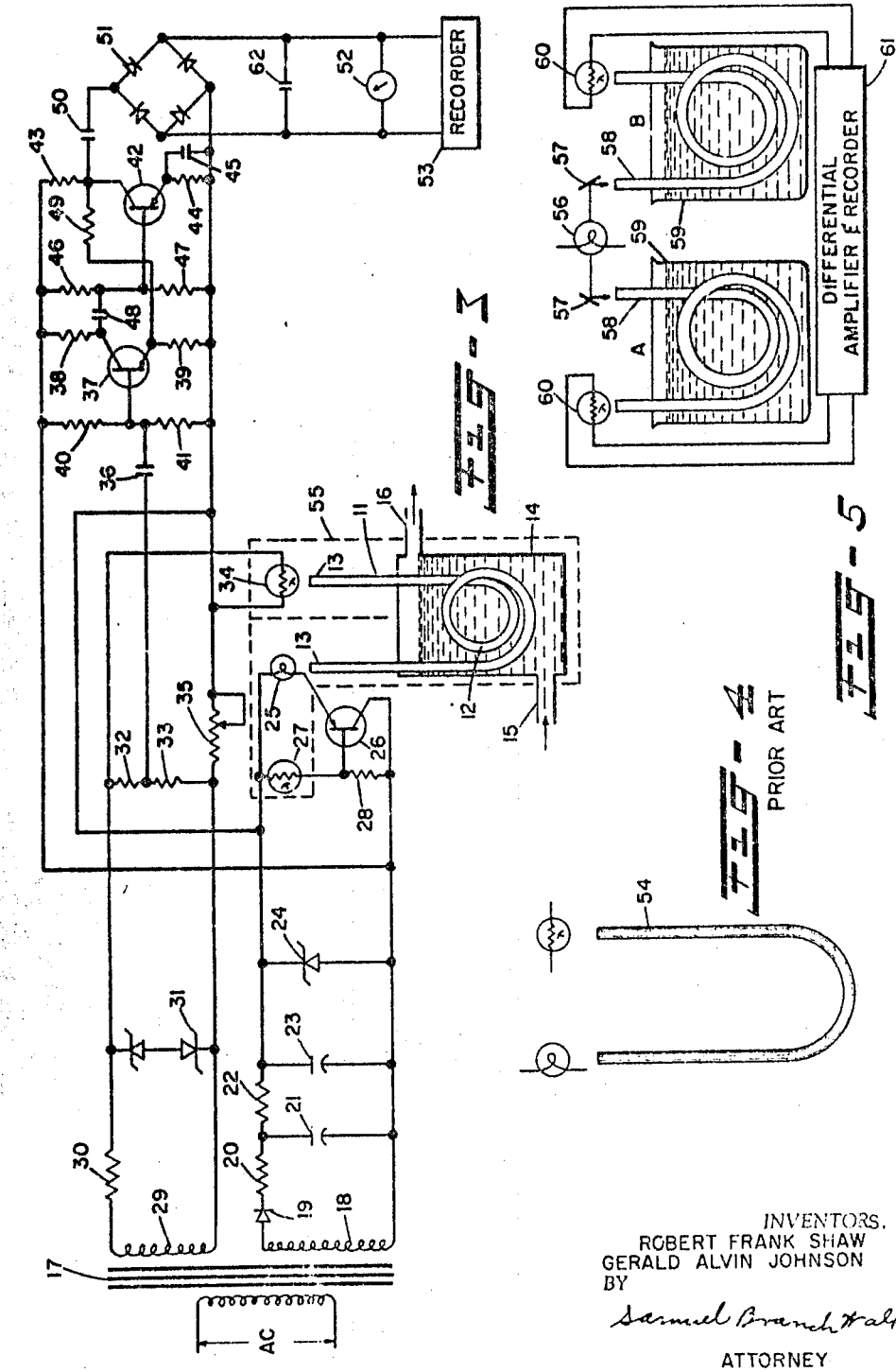

United States Patent Office 3,282,149
Patented Nov. 1, 1966

3,282,149
LINEAR PHOTOELECTRIC REFRACTOMETER
Robert Frank Shaw and Gerald Alvin Johnson, Stamford, Conn., assignors to American Cyanamid Company, Stamford, Conn., a corporation of Maine
Filed Apr. 10, 1963, Ser. No. 271,976
8 Claims. (Cl. 88—14)

This invention relates to a refractometer for measuring the index of refraction of a fluid, by measuring the transmission of light through a coiled bar having a curvature of at least 360°, which transmission is a substantially linear function of the index of refraction; and to electronic circuits for stability in such circuits, including a photoresistor-transistor circuit for stabilizing the light output of a light source.

The index of refraction for any substance is the ratio of the velocity of light in a vacuum to the velocity in the substance. Mathematically it can be shown that the ratio of the sine of the angle of incidence to the sine of the angle of refraction at an interface between the substance and a vacuum is also the index of refraction. In general, the index of refraction for a substance varies with the wave length of the light.

Where light is passing from a substance of higher index of refraction to a substance of lower index of refraction and the ratio of the sines would call for the sine of the angle to be more than one, a mathematical impossibility by definition, the incident light is internally totally reflected in the substance of higher index of refraction. The velocity of light is always less in a dielectric medium than in a vacuum. As Clerk Maxwell explains it, the slowing down is due to the interaction of the polarizable electrons of the molecules in the medium with the oscillating electric field of light. Certain interrelationships between the index of refraction and other properties of a medium are given in various textbooks, as for example, "Physical Chemistry," Gordon M. Barrow, McGraw-Hill, New York, 1961.

The classical method for measuring the index of refraction of a liquid has been to immerse a transparent dielectric, such as glass, in the liquid and measure the maximum angle of incidence of a totally reflected ray. While such an instrument is classically useful, it is frequently convenient to be able to measure the index of refraction photoelectrically without the necessity for determining such an angle optically.

One such device is described by Enoch Karrer and Roland S. Rorr in the Optical Society of America 36, pages 42 to 46 (January 1946). An article by N. S. Kapany and J. N. Pike, "Fiber Optics Part IV, a Photorefractometer," Journal of the Optical Society of America 47, pages 1109 to 1117 (December 1957), shows a mathematical derivation for the transmission of light down a straight transparent rod where the index of refraction of the surrounding material is less than the rod index with some of the light reflected at angles less than the angle of critical incidence and all of the light reflected at angles below that of critical incidence. Thus by measuring the transmitted light the index of refraction can be measured. From a practical standpoint, such a method of measurement is mathematically precise and absolute in that the index of refraction of the surrounding material can be calculated, but the plot of the refractive index against relative output is a curved line. Also, any mathematical analysis is only as accurate as are the dimensions of the rod.

We have now found that by using a coiled bar having at least 360° of curvature, a plot can be obtained in which the ratio of relative light output to refractive index is a straight line over useful ranges.

The bar itself is of a transparent dielectric material which has a refractive index higher than that of the fluid whose index of refraction is to be measured. The bar must be reasonably transparent at the wave length under consideration.

The bar may have a cross section which is rectangular, square, elliptical or partly polygonal and partly rounded or entirely polygonal or entirely rounded. Usually a round rod is more readily obtained and shaped commercially and hence is used. Because other shapes of cross-sections than round give good results, it is not necessary that the rod be optically perfectly round and may be distorted from a circular cross section during bending without complicating measurements.

The shape of ends of the rod is not critical. A reasonably flat surface such as obtained by breaking and fire-polishing the ends of a glass rod gives good results. Optically flat ends also give good results. A separate or integral lens system can be used to compensate for disparity between the size of the rod end and the light source or photoresistor. A heat molding of the ends of the rod is usually sufficiently accurate.

The bar, preferably a round rod, must have an index of refraction higher than that of the substance to be measured. Many organic plastics such as polystyrene, polymethylstyrene, polymethylmethacrylate or other transparent plastics give good results. Plastic has the advantages that it is not fragile and plastics are available with a wide range of indices of refraction. Plastic has the disadvantage that the shape of the rod may be changed after calibration, and hence its optical characteristics, by stress and many plastics interact with or dissolve in liquids whose indices of refraction are to be measured. A glass rod or quartz rod has the advantage that it is shaped and easily formed and inert towards most fluids whose indices of refraction are to be measured. Glass is not easily deformed mechanically without breaking; although glass is fragile and subject to breakage. Hence the material of the rod can be selected to best serve in the system under consideration.

The bar must be of a material which is susbtantially transparent to the light being used. The incident light to be transmitted along the rod may be in the visible part of the spectrum, in the infrared part of the spectrum, or the ultra-violet part of the spectrum. It is quite customary to speak of electromagnetic radiation in both the infrared and ultra-violet portions of the spectrum as light even though radiation in such portions is not visible to the human eye.

The light may be monochromatic in any of the regions of infrared, visible or ultraviolet light and may be coherent. Obviously the index of refraction being measured is a function of the light incident on the end of the rod. If the index of refraction at any particular wave length is desired then, of course, monochromatic light of that wave length, whether in the infrared, visible or ultra-violet part of the spectrum, must be used. Light with a random wave front, or coherent light, as from a laser, may be used. Similarly the light can be polarized although polarization is not necessary.

For many purposes light from an ordinary tungsten filament gives useful information without the necessity for the refinements as to uniformity of wave length, coherency, or polarization.

The rod must be of a material which is substantially transparent to the light in the region under consideration. Ordinary glass is transparent to light in the visible region although it becomes partially opaque in both the ultra-violet and infrared regions. No glass or plastic is absolutely transparent but if the transparency is such that a reasonable portion of the incident light can be transmitted through the rod to a photodetector, at the wave length under consideration, a rod of such materal is satisfactory.

Quartz is particularly useful in the ultraviolet region although it is opaque in the infrared region beyond 7 microns. Glass has an index of refraction ($n_d$) from around 1.516 for light crown glass to around 1.96 for heavy flint glass. Special glasses with a higher index of refraction and with transparency over unusual ranges may be used for the rod where the index of refraction in such regions is to be measured.

Germanium or silicon can be used for the rod in the regions to which such materials are transparent and for the measurements of indices of refraction less than that of the material of the rod.

For many purposes a hard glass, usually known as "Pyrex" gives excellent results and hence can be recommended for the ranges over which it is transparent and for fluids whose index of refraction is less than that of the Pyrex glass.

To secure a relative transmission which is linear with refractive index the rod must have a coil of at least 360°. It is usually convenient to have a turn and a half, that is 540° of curvature so that the emergent ends of the coil are parallel and pointed in the same direction. For cost reasons it is desirable to be able to use a rod whose coiling and cross section are not optically perfect, as precision in shaping is expensive. Preferably the coil has the form of a spiral of Archimedes so that the curvature varies slightly along the coil and hence the effect of minor variations is reduced so that slight imperfections in shaping are unimportant and do not cause a detrimental or non-linear effect in the output. Because of the shape of the rod, even if optically perfect, a theoretical derivation would be extremely difficult and hence it is more convenient to use drawn glass rods, shaped by simple methods, such as glassblowing, and to calibrate the individual rods. Optical precision is not necessary. Ambient light from external sources does not affect the measurement if such light is uniform but because of the possibility of non-uniform stray light, it is convenient although not necessary to minimize incident light as, for example, by shielding the system, thus minimizing the effect of variations in stray light. Because of the shape of the coil most stray light would necessarily be reflected to a considerable extent from the surface of the rod without being transmitted through the rod to the light detector.

Having thus described the broader aspects of the present invention, certain preferred embodiments thereof are set forth by way of illustration.

In the drawings:

FIGURE 3 is a wiring diagram of one modification of the refractometer, including a novel light source.

FIGURE 4 is a partial view of a refractometer using a rod in the form of a U.

FIGURE 5 is a diagrammatic view of the refractometer using two separate looped rods, which thus permits the ready comparison with the indices of refraction of two different liquids, A and B.

Figure 1:
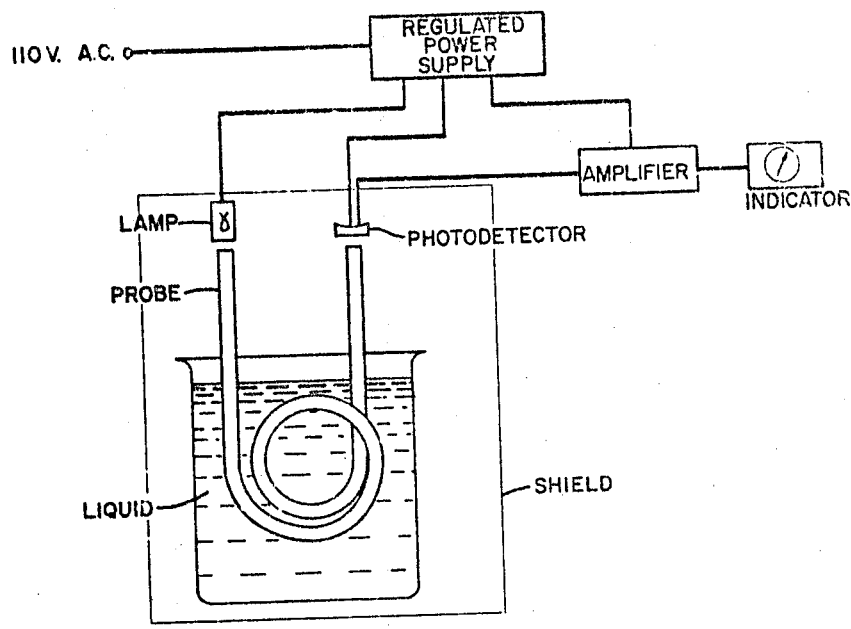
FIGURE 1 is a diagrammatic view of the complete refractometer.

A Pyrex rod 11 is formed as a loop 12 in which the loop is in the form of a spiral of Archimedes with a total curvature of 540°, that is, a turn and a half, and with the ends of the rod approximately parallel. Good results can be obtained with a rod about 9 millimeters in diameter and in which the loop is such that the ends 13 are about 7 centimeters apart. The shaping is not critical. Commercial grade rods, bent by a glass blower, are satisfactory. (Optical precision is not needed.) The loop rod is in a fluid chamber 14. A fluid entrance 15 and fluid discharge 16 provide for fluid to flow into the fluid chamber and out of the fluid chamber. Usually, but not necessarily, the fluid is a liquid and usually, but by no means necessarily, at atmospheric pressure or close thereto.

LIGHT SOURCE

Power is provided through a transformer 17 having two secondary windings. One power winding 18 feeds a conventional rectifier 19, and through a first filter resistor 20 charges a first capacitor 21 which in turn through a second filter resistor 22 charges a second capacitor 23 forming a conventional rectifier D.C. power supply. Across the output of this power supply is connected a Zener diode 24 to give a stabilized D.C. voltage. One such suitable Zener diode is supplied by International Rectifier rated at 30 volts.

Also across this power supply is connected a tungsten light bulb or lamp 25 in a series with and to the emitter of a power transistor 26. The base of the power transistor 26 is connected to the junction between a control photoresistor 27 and a base resistor 28. The base resistor 28 and the control photoresistor 27 form a voltage divider across the power supply and control the voltage of the base of the power transistor. The photoresistor is illuminated by the tungsten light bulb 25 and, therefore, the resistance of the photoresistor varies with the intensity of illumination. Values are selected such that a desired light intensity is obtained and if the voltage tends to rise so that the tungsten light bulb glows brighter, the control photoresistor receives more illumination, cutting down on the resistance value, which in turn reduces the voltage drop across the emitter to base, reducing the current flow through the tungsten lamp bulb and as a result very stable illumination is obtained even over a wide voltage swing. The Zener diode so stabilizes the power supply that there is very little change in power supply voltage over any reasonable commercial variations in A.C. power. Thus the light source is stable over long periods.

While the present invention is in no sense limited thereto, good results are obtained with a number 47 tungsten light bulb rated at 6–8 volts and 150 milliamps in series with a No. 2N307 power transistor using a cadmium sulphide control photoresistor and a 6.9K ohm ½ watt base resistor. A change of line voltage of as much as plus or minus 15 volts A.C. in a 117 volt supply and an aging of the tungsten light bulb of 500 hours gives no appreciable effect on the intensity of the light source. Any change in light intensity is less than .001%, the limit of accuracy of available measuring equipment.

THE PHOTODETECTOR SYSTEM

The photodetector system shown in FIGURE 3 is designed to, by a bridge circuit, provide an A.C. output which is more conveniently amplified than a D.C. output, which output, as will be later described, is amplified and measured conveniently by rectification in another bridge circuit. A second power winding 29, rated at 12.6 volts, supplies power through a dropping resistor 30 to a pair of Zener diodes 31, which are connected back to back in series with the dropping resistor 30 across the output of the second power winding 29. This gives a stable A.C. output of about 3 volts having a drastically clipped wave form tending towards the shape of a square wave. Across this clipped-wave power supply is attached two bridging resistors 32 and 33, forming two elements of the bridge shunted across which also is a measuring photoresistor 34 and a variable control resistor 35. The junction of the bridging resistors 32 and 33 and the measuring photoresistor 34 and variable control resistor 35 are connected through an isolating capacitor 36 (25 mfd. 25 volts) to an A.C. amplifier. A typical circuit has values of 6.8K ohms and ½ watt respectively for the bridging resistors 32 and 33 a 25K ohm variable control resistor and a 15K dark resistance measuring photoresistor.

A.C. AMPLIFIER

Any sensitive stable A.C. amplifier gives good results. One such, as shown in FIGURE 3, consists of a first amplifying transistor 37 which is connected across the Zener diode 24 power supply using a collector resistor 38, and an emitter resistor 39, and with the base voltage controlled by a first base resistor 40 connected to the collector side of the power supply and a second base resistor 41 connected to the emitter side of the power supply. A second amplifying transistor 42 is also connected across the power supply with a second transistor collector resistor 43 in series with said second amplifying transistor. The second transistor emitter resistor is shunted by an emitter capacitor 45. The base voltage of the second transistor is controlled by a base resistor 46 connected between the base and the collector side of the power supply and a base resistor 47 connected between the base and emitter side of the power supply. A second isolating capacitor 48 is connected from the collector of the first transistor to the base of the second transistor to carry the A.C. signal. A feedback resistor 49 is connected from the collector of the second transistor to the emitter of the first transistor. This feedback resistor gives negative feedback and stabilizes amplification. The A.C. component of the output of the second transistor collector is fed through an output capacitor 50 to a 4-diode bridge 51. The opposite side of the bridge is connected to the power supply return. The intermediate corners of the bridge (output diagonal) are connected to a filter capacitor 62, an output meter 52, and a recorder 53. The sensitivity of the output meter and the recorder can vary depending upon the sensitivity desired for the system. A 0.5 to 1.00 volt meter and/or a recorder reading 0.50 to 1.00 volts full scale gives good results, although for flexibility it is frequently desired to have a variable scale available both on the output meter and the recorder. A millivoltmeter extends the sensitivity.

Figure 2:
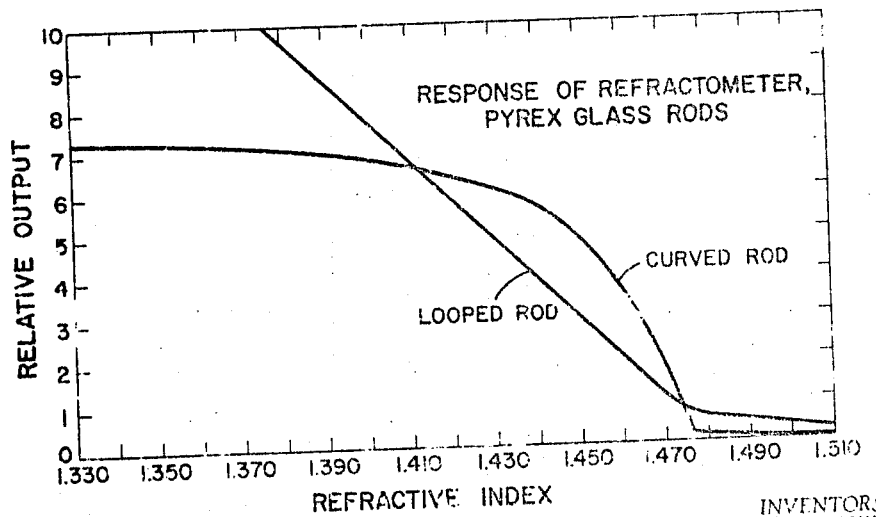
FIGURE 2 is a graph showing the relative response for a loop rod such as is shown in FIGURE 1, as compared with a curved rod as, for example, shown in FIGURE 4.

In use, the variable control resistor 35 can be set to zero the output at any point along the output curve, and the output meter and recorder can be used at a lower full scale value or the gain of the amplifier increased. The measuring photoresistor 34 is adjacent to the output end 13 of the Pyrex rod loop. Light from the lamp internally reflected in the rod passes through the rod and to the photoresistor. A typical response curve is as shown in FIGURE 2 where for a Pyrex glass rod having an index of refraction of 1.474, a substantially straight line is obtained from a refractive index of about 1.47 to a refractive index of less than 1.38 as shown on the graph and actually to below the index of refraction of common liquids such as water ($n_d 1.333$), ethanol, methanol, toluene and other common organic liquids.

It is to be understood that the above component values are given by way of illustration and not limitation. The illumination may be any desired source and may be monochromatic, or over a range, filtered or unfiltered, in the ultraviolet, visible, or infrared spectrum. The measuring photodetector is chosen to be sensitive to the wave length or lengths under consideration and the rod is chosen to be substantially transparent to the radiation under consideration, and unaffected by the fluids under conditions of use.

A prior art refractometer is shown in FIGURE 4 in which the lamp and photoresistor are at opposite ends of a U-shaped rod 54. For such a shape of rod a curved response is obtained, as shown in FIGURE 2 for the line marked "curved rod." While useful, a looped rod or bar which gives a straight line on the relative output versus refractive index plot is a critical feature of the present invention, and simplifies use.

A light shield 55 may be used to shield the photodetectors from the effect of stray light. Where a constant illumination is used, as for example, in a laboratory with a reasonably constant illumination level, stray light from the sides of the rod 11 causes a comparatively slight effect on response and for many measurements permits the use of the device in a lighted room without a light shield. Where optimum sensitivity is desired, a light shield minimizes the effect of stray light.

As shown in FIGURE 5, a single light source 56 is deflected by mirrors 57 through separate coiled rods 58 in separate receptacles 59 labeled A and B and on to separate photodetectors 60, the outputs from which are fed to a differential amplifier and recorder 61. This may be a pair of amplifiers such as above described, connected to give a bucking voltage or may be any conventional form of differential amplifier and recorder. Separate fluids can be introduced into the containers A and B and extreme sensitivity can be obtained, or for example, a single process stream can be directed sequentially through A and B and extremely small variations in the refractive index measured. Similarly, one of the containers may have a standard fluid and the other a sample. As all circuits are comparable, errors tend to cancel out giving an extremely sensitive record of changes in the refractive index. Whereas normally the refractive index is measured at about room temperature and about room pressure, the present device permits the looped rod to be sealed in a chamber with the ends 13 emergent so that the chamber may have a wide variation of pressure and temperature conditions under which measurements of refractive index are desired. For example, the fluid chamber 14 could be used to measure the index of refraction of a sample of water heated to above the critical temperature and both pressure and temperature dropped so that the studies can be conducted of the index of refraction of water as that index drops with increasing temperature and connects up continuously to the index of refraction of water vapor which is comparatively low at room temperature. This permits a study of the index of refraction in the supercritical state. It is to be understood, of course, that other materials may be studied under critical conditions or other conditions of choice, as the flexibility of the present device permits a wide range of measurements to be made as value of the refractive index becomes of greater value as studies of their significance become available.

Because the light retained in the rod is being measured, the color of the liquid, or solid particles or air bubbles in the liquid do not adversely affect the ease or accuracy of measurement of the index of refraction. The only real limit is that the liquid must have a lower index of refraction than the rod.

The instrument of course must be calibrated, but because the relative output versus refractive index is a straight line, determination at two points establishes the line. Preferably the temperature of calibration is the temperature of use, but a correction factor can be used based on experience.

The instrument can conveniently measure the index of refraction to the fifth decimal place. For greater accuracy, the temperature of the liquid must be closely controlled. Where temperature is closely controlled, particularly with differential systems, the accuracy can be extended. Temperature control of the system is usually the limiting factor.

Obviously the polarity can be reversed and NPN transistors used, or other amplifier or light source means. Corresponding variations in circuitry are obvious to those skilled in the art.

The scope of the present invention is illustrated by the above description and defined in the following claims.

We claim:

1. A refractometer for measuring the index of refraction of a fluid comprising a coiled bar having at least 360° of curvature, a source of light of constant intensity so positioned that at least part of the light from said source is incident on one end of said bar, and directed along the length of the bar, and includes at least one wave length to which the bar is transparent, and a photodetection means at the other end of said bar to measure the transmitted radiant energy passed longitudinally through said bar, means to maintain the entire coiled portion of said coiled bar immersed in said fluid, and protect the bar and detection means from variable intensity stray light, whereby the transmitted light is subject to multiple internal reflections at the bar-liquid interface along said coiled portion of said bar so that the value of the transmitted light is a substantially linear function of the refractive index of said fluid.

2. A refractometer for measuring the index of refraction of a fluid comprising a coiled bar having at least 360° of curvature, a source of light so positioned that at least part of the light from said source is incident on one end of said bar and directed along the length of the bar, and includes at least one wave length to which the bar is transparent, and a photo-detection means at the other end of said bar to measure the transmitted radiant energy passed longitudinally through said bar, means to compare the ratio of transmitted energy to incident energy, means to maintain the entire coiled portion of said coiled bar immersed in said fluid, and protect the bar and detection means from variable intensity stray light, whereby the value of the ratio of transmitted light to incident light is a substantially linear function of the refractive index of said fluid.

3. The refractometer of claim 1 in which the coiled bar is a glass rod, and the source of light is an incandescent electric light bulb.

4. A refractometer for measuring the index of refraction of a liquid comprising a coiled glass rod having about 540° of curvature, and parallel ends, an incandescent electric light bulb, means to maintain the light from said bulb at constant intensity, said bulb being so positioned that at least part of the light is incident on one end of said rod and directed along the length of the rod, and a photo-detector means at the other end of said rod to measure the transmitted light passed longitudinally through said rod, whereby the transmitted light is subject to multiple internal reflections at the rod-liquid interface along said coiled portion of said rod so that intensity of the transmitted light is a linear function of the refractive index of the liquid, and means to immerse the entire coiled portion of said coiled rod in a body of said liquid and protect said photodetection means from the effect of variable intensity stray light.

5. The refractometer of claim 4 in which the photoelectric means comprises a four-arm resistance bridge, one of said arms being a variable resistor, and a second adjacent arm is a photoresistor adjacent to the other end of said coiled glass rod, and illuminated by light transmitted through said rod, means to apply an alternating potential across one diagonal of said bridge, and means to amplify and detect the potential across the other diagonal of said bridge.

6. The refractometer of claim 5 in which the means to immerse said coiled rod is a pressurized vessel permitting measurement of refractive index under high temperature and pressure.

7. A comparative refractometer comprising a single light source, means to transmit light from said source down the ends of and longitudinally through each of two coiled glass rods, having at least 360° of curvature each, separate photodetection means to measure the light transmitted by multiple internal rod-liquid reflections along said coiled portions and through the exit ends of each of said coiled glass rods, and a differential amplifier to measure the difference in light transmitted by each of said coiled rods and separate containers each having therein a liquid in which the entire coiled portions of one of said coiled glass rods are immersed, thereby measuring linearly the difference in refractive index of the liquids in each of said containers.

8. The refractometer of claim 1 in which the source of light of constant intensity is an incandescent electric light bulb connected in series with a transistor so that the controlled current passes through said bulb, and the base of the transistor is connected to the junction of a resistor and photoresistor in parallel with said series connected bulb and transistor, said photoresistor being illuminated by light from said bulb, and hence varying in resistance with the intensity of said light, whereby the base potential of the transistor is varied in a direction to control the flow of current through the bulb so as to maintain the intensity of light substantially constant.

References Cited by the Examiner

UNITED STATES PATENTS

| 2,477,646 | 8/1949 | Perlow et al. | 315—151 |
| 3,051,869 | 8/1962 | Richards. | |
| 3,130,349 | 4/1964 | Mallory | 315—151 |

JEWELL H. PEDERSEN, *Primary Examiner.*

JOHN K. CORBIN, *Examiner.*